United States Patent
Wernersson

(10) Patent No.: US 7,903,929 B2
(45) Date of Patent: Mar. 8, 2011

(54) OPTICAL DISPLAY FOR PORTABLE ELECTRONIC DEVICE

(75) Inventor: Mats G. H. Wernersson, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1296 days.

(21) Appl. No.: 11/425,320

(22) Filed: Jun. 20, 2006

(65) Prior Publication Data
US 2007/0291188 A1    Dec. 20, 2007

(51) Int. Cl.
*H04B 1/38* (2006.01)
(52) U.S. Cl. .................. 386/224; 455/90.1
(58) Field of Classification Search ........... 386/46, 386/95, 107, 117, 118; 455/567, 90.1; 345/31
See application file for complete search history.

(56) References Cited

U.S. PATENT DOCUMENTS 5,444,456 A    8/1995   Ohta et al.
6,954,658 B2 *  10/2005   Engstrom et al. ........... 455/567

FOREIGN PATENT DOCUMENTS

EP    0 546 844    6/1993
EP    1 443 385    8/2004

OTHER PUBLICATIONS

International Search Report and Written Opinion for corresponding International Application No. PCT/IB2006/003675 mailed Dec. 16, 2008.

* cited by examiner

*Primary Examiner* — Huy T Nguyen
(74) *Attorney, Agent, or Firm* — Renner, Otto, Boisselle & Sklar, LLP

(57) ABSTRACT

A portable electronic device is provided that includes an optical display, a display controller for presenting display data to the optical display in order to display the display data; and an accelerometer operatively coupled to the display controller. The display controller presents the display data to the optical display as a function of motion of the portable electronic device as sensed by the accelerometer.

17 Claims, 5 Drawing Sheets

OPTICAL DISPLAY FOR PORTABLE ELECTRONIC DEVICE

TECHNICAL FIELD OF THE INVENTION

The present invention relates generally to optical displays, and more particularly to optical displays for portable electronic devices.

DESCRIPTION OF THE RELATED ART

Portable electronic devices have been popular for decades, and continue to increase in popularity. For example, portable CD or DVD players, MPEG players, MP-3 players, game consoles, etc., provide a variety of forms of personal entertainment. Similarly, portable electronic devices in the form of mobile phones, pagers, communicators, e.g., electronic organizers, personal digital assistants (PDAs), smartphones, etc., provide functionality as well as entertainment. Such devices allow a user to communicate with others, store and manipulate data, create text, listen to music, view videos, etc., many times within the same device.

While portable electronic devices typically include displays to communicate information to the user, the displays are limited in size else the portability of the devices is sacrificed. These displays of limited size obviously do not lend themselves well to allowing viewing by those other than the immediate user of the device. Consequently, enjoyment of the portable electronic devices may be somewhat limited in this regard.

In view of the aforementioned shortcomings associated with conventional portable electronic devices, there is a strong need in the art for a portable electronic device having display capabilities that extend beyond the user alone. More particularly, there is a strong need in the art for a portable electronic device and display that provides viewing enjoyment for multiple parties.

SUMMARY

According to an aspect of the invention, a portable electronic device is provided that includes an optical display, a display controller for presenting display data to the optical display in order to display the display data; and an accelerometer operatively coupled to the display controller. The display controller presents the display data to the optical display as a function of motion of the portable electronic device as sensed by the accelerometer.

In accordance with a particular aspect of the invention, the display controller presents the display data to the optical display with timing that relies on the motion of the portable electronic device and persistence of a viewer's vision in order to present an intelligible display.

According to another aspect, the timing is a function of a motion velocity of the portable electronic device.

According to still another aspect, the motion velocity is determined as a function of the output of the accelerometer.

In accordance with still another aspect, the display data comprises a character string, and the display controller presents the display data to the optical display sequentially beginning at a first end of the character string when the accelerometer senses motion in a first direction, and beginning at a second end of the character string when the accelerometer senses motion in a second direction opposite the first direction.

With yet another aspect of the invention, back and forth motion of the portable electronic device in the first and second directions results in repeated display of the character string.

In accordance with yet another aspect, the display controller keeps track of a position at which the display of the character string ended during a previous motion in order to determine a position at which to begin the display of the character string during the next motion in the back and forth motion.

According to still another aspect, the optical display consists of a linear array of optical elements.

In still another aspect, the optical display comprises a rectangular array of optical elements.

According to another aspect, the rectangular array of optical elements relies on the motion of the portable electronic device to provide an optical display having an effective width greater than the width of the rectangular array itself.

With still another aspect, the movement is generally horizontal.

In still another aspect, the movement is generally vertical.

In yet another aspect, the display data comprises graphical image data.

According to yet another aspect, the portable electronic device comprises mobile phone electronics for carrying out mobile communications.

In accordance with another aspect, the optical display also functions to alert a user of an incoming call.

In accordance with still another aspect, the optical display comprises a plurality of light emitting diodes (LEDs).

According to another aspect of the invention, a method of providing a display using a portable electronic device having an optical display is presented. The method includes the steps of sensing motion of the portable electronic device using an accelerometer; and presenting display data to the optical display as a function of motion of the portable electronic device as sensed by the accelerometer.

According to another aspect, the step of presenting the display data to the optical display includes presenting the display data to the optical display with timing that relies on the motion of the portable electronic device and persistence of a viewer's vision in order to present an intelligible display.

In accordance with another aspect, the timing is a function of a motion velocity of the portable electronic device.

With still another aspect, the motion velocity is determined as a function of the output of the accelerometer.

According to still another aspect, the display data comprises a character string, and the step of presenting the data includes presenting the display data to the optical display sequentially beginning at a first end of the character string when the accelerometer senses motion in a first direction, and beginning at a second end of the character string when the accelerometer senses motion in a second direction opposite the first direction.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

It should be emphasized that the term "comprises/comprising" when used in this specification is taken to specify the presence of stated features, integers, steps or components but

DETAILED DESCRIPTION OF EMBODIMENTS

Figure 1:
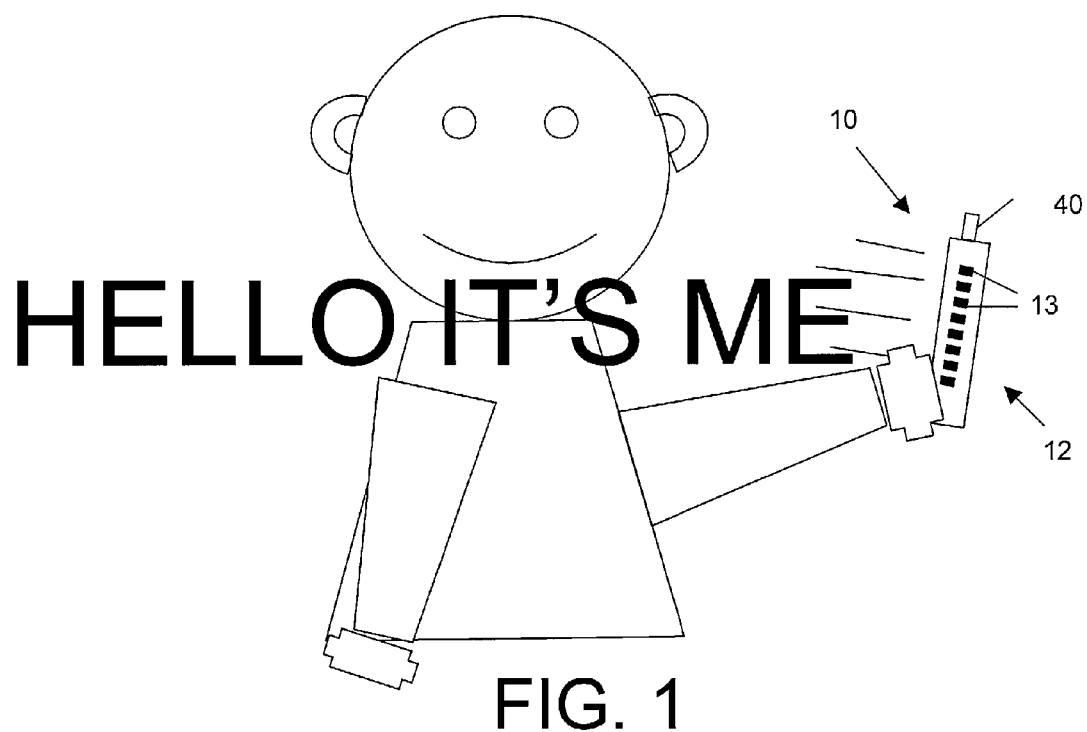
FIG. 1 is a schematic illustration of a portable electronic device providing an optical display in accordance with an embodiment of the present invention.

The present invention will now be described with reference to the drawings, wherein like reference numerals are provided for like elements throughout.

Referring initially to FIG. 1, the present invention relates to a portable electronic device 10 in the form of a mobile phone, MP-3 player, or the like. As represented in FIG. 1, the electronic device 10 includes an optical display 12 that, in the exemplary embodiment, is formed by a linear array of optical elements 13 such as light emitting diodes (LEDs) or the like. Implementing technology utilized in what are known as "propeller clocks", the optical display 12 relies on motion of the portable electronic device 10 in combination with the persistence of a viewer's vision to produce a display that can be seen by a number of viewers even at considerable distance.

As will be explained in more detail below, the portable electronic device 10 presents display data to the optical display 12 during motion of the portable electronic device 10. The portable electronic device 10 senses motion and provides the data to the display 12 as a function of such motion such that with the persistence of the viewer's vision, an intelligible display is created. For example, FIG. 1 illustrates how a user may move the portable electronic device 10 back and forth in a horizontal sweeping motion. The portable electronic device 10 controllably illuminates the optical elements 13 within the display 12 during such motion. As a result, the portable electronic device 10 can display a message (e.g., "Hello, It's Me") or the like with an effective display width considerably larger than the width of the optical display 12 itself.

The aforementioned propeller clocks utilize an array of LEDs that spin at a predetermined repetition rate to form a display. The LEDs are illuminated with timing based on the particular repetition rate, and in combination with the persistence of a viewer's vision, present a visual display representing the time of day.

The portable electronic device 10 of the present invention differs from such propeller clocks, however. The portable electronic device 10 is not set in motion by a precision controlled motor with precision repetition rate as in the case of the propeller clocks. Rather, the portable electronic device 10 relies on non-precision movement such as movement caused by a user moving the portable electronic device 10 back and forth in a sweeping motion. In order to provide appropriate timing for illuminating the LEDs or other type optical elements 13, the portable electronic device 10 includes an accelerometer that may be used to sense the direction, acceleration, velocity and/or position of the portable electronic device 10 during each sweeping motion. Based on such information, the portable electronic device 10 presents the display data to the optical display 12 during the sweep in order to present the intended display to the viewers. Otherwise, the presentation of the display data in combination with the movement of the portable electronic device 10 and the persistence of a viewer's vision result in an intelligible display in much the same manner as the propeller clocks.

Figure 2:
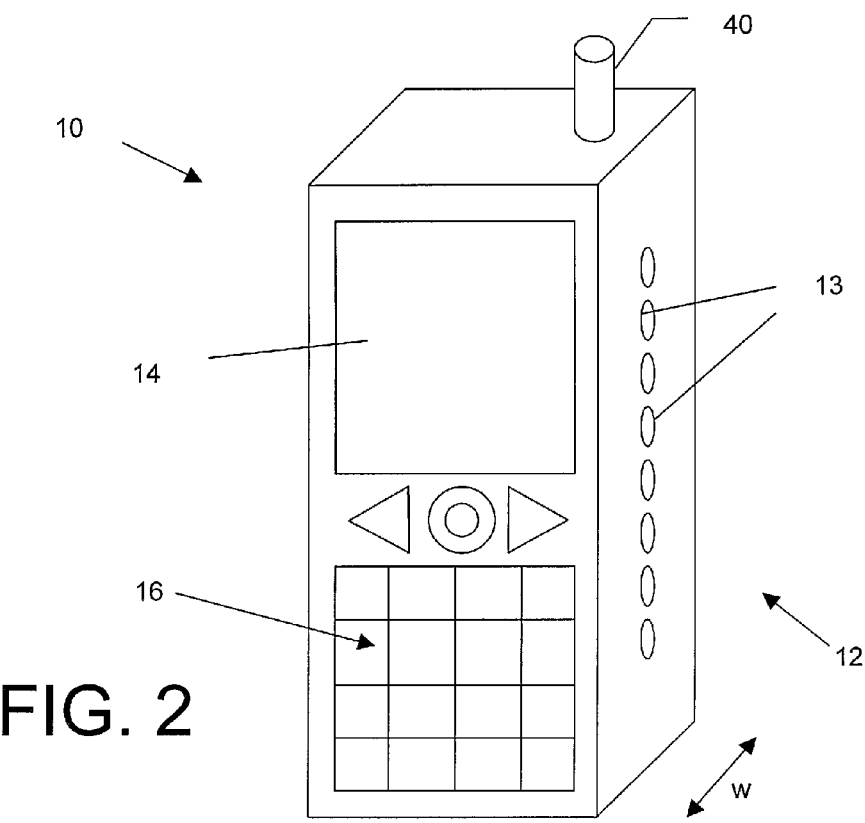
FIG. 2 illustrates a portable electronic device in accordance with an embodiment of the present invention.

FIG. 2 illustrates an exemplary embodiment of the portable electronic device 10. In the exemplary embodiment, the portable electronic device 10 is a mobile phone for use in carrying out mobile communications. Those having ordinary skill in the art will appreciate, however, that the present invention has utility with virtually any type of portable electronic device. Accordingly, the scope of the present invention in the broadest sense is not intended to be limited to a mobile phone.

The mobile phone 10 as shown in FIG. 2 has a "brick" or "block" design type housing. It will be appreciated, however, that other type housings such as clamshell or slide-type housings may be utilized without departing from the scope of the invention. The mobile phone 10 includes a conventional display 14 and keypad 16. The display 14 displays information to a user such as operating state, time, phone numbers, contact information, various navigational menus, etc., which enable the user to utilize the various features of the mobile phone 10. Similarly, the keypad 16 may be conventional in that it provides for a variety of user input operations. For example, the keypad 16 typically includes alphanumeric keys for allowing entry of alphanumeric information such as telephone numbers, phone lists, contact information, notes, etc. In addition, the keypad 16 typically includes special function keys such as a "call send" key for initiating or answering a call, and a "call end" key for ending, or "hanging up" a call. Special function keys may also include menu navigation keys, for example, for navigating through a menu displayed on the display 14 to select different phone functions, profiles, settings, etc., as is conventional. Other keys included in the keypad 16 may include a volume key, on/off power key, as well as various other keys such as a web browser launch key, camera key, etc.

In the particular embodiment of FIG. 1, the mobile phone 10 includes the display 14 and separate keypad 16. In an alternative embodiment, the display 14 may comprise a touchscreen which itself includes one or more keys. In yet another embodiment, the display 14 may comprise a touchscreen that includes all or substantially all of the keys used to operate the phone 10 so as to include a very limited keypad 16 or no keypad 16 at all. As will be appreciated, the particular form and function of the keys included in the keypad 16 or touchscreen/display 14 are not germane to the invention in its broadest sense.

As previously noted, the portable electronic device (in this case the mobile phone 10) includes an optical display 12 in accordance with the present invention. In the exemplary embodiment, the display 12 is made up of a plurality of optical elements 13 such as LEDs. The optical elements 13 in the exemplary embodiment are arranged in a single linear array (e.g., 1×8 array) along a side face of the mobile phone 10. Alternatively, the optical elements 13 may be arranged in some other array pattern (e.g., an m×n rectangular array. Notably, however, the width of the array (i.e., in the direction of arrow w) is typically less than the width necessary to produce an intelligible optical display without relying upon movement of the mobile phone 10 in the direction of the arrow w and the persistence of a viewer's vision.

Figure 3:
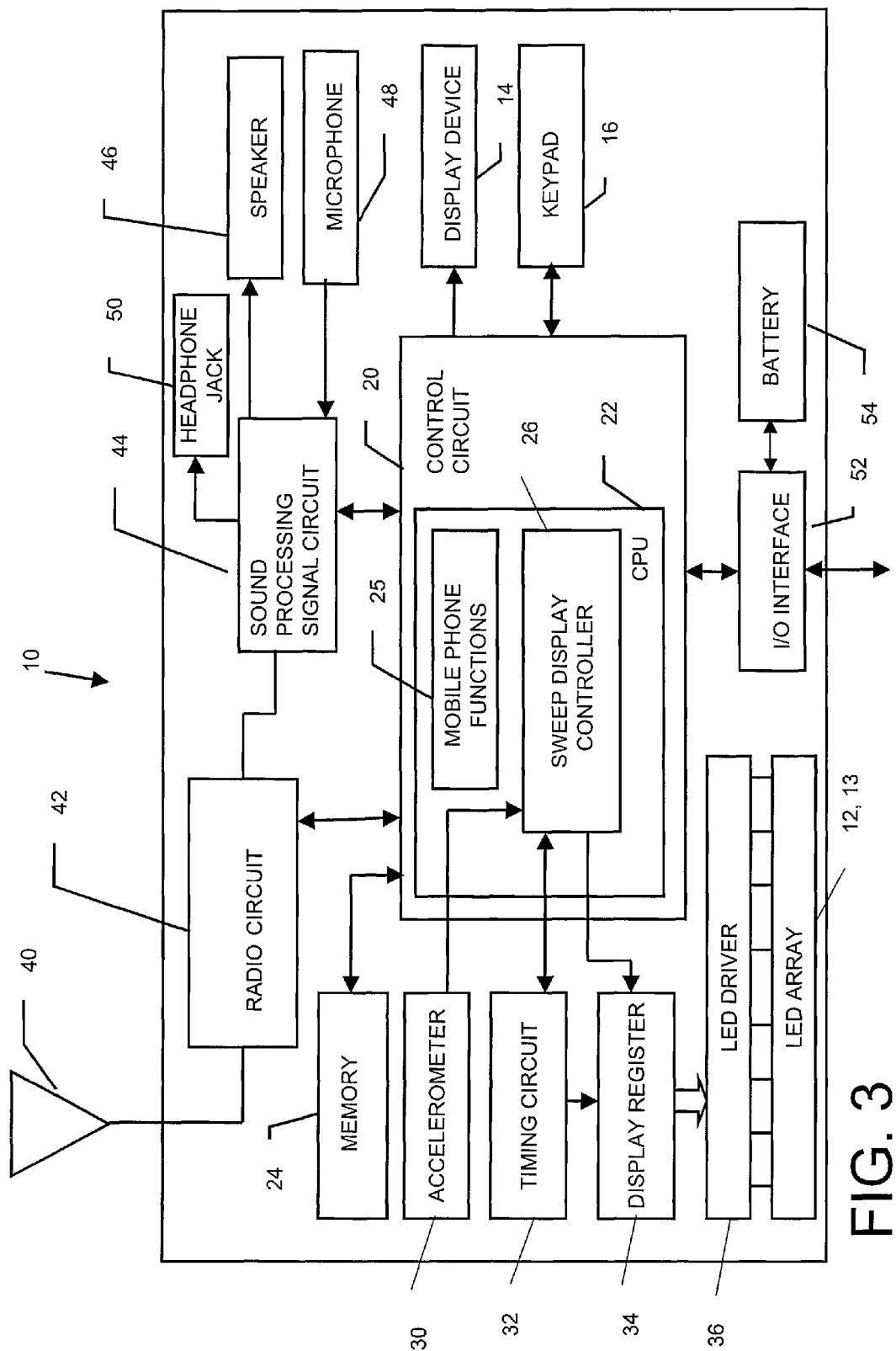
FIG. 3 is a block diagram of the portable electronic device of FIG. 2 in accordance with an embodiment of the present invention.

FIG. 3 represents a functional block diagram of the mobile phone 10. The construction of the mobile phone 10 is generally conventional with the exception of the sweep display operation of the display 12 as described herein. Preferably, the sweep display operation is implemented primarily via application software within the mobile phone 10. However, it will be apparent to those having ordinary skill in the art that such operation can be carried out via primarily software, hardware, firmware, or combinations thereof, without departing from the scope of the invention.

The mobile phone 10 includes a primary control circuit 20 that is configured to carry out overall control of the functions and operations of the mobile phone 10. The control circuit 20 may include a CPU, microcontroller, or microprocessor, etc., collectively referred to herein simply as a CPU 22. The CPU 22 executes code stored in memory (not shown) within the control circuit 20, and/or in a separate memory 24 in order to carry out conventional operation of the mobile phone functions 25 within the mobile phone 10. In addition, however, the CPU 22 executes code stored in the memory 24 in accordance with the present invention in order to perform a sweep display controller function 26 in relation to the display 12 as will be explained more fully below.

As illustrated in FIG. 3, the mobile phone 10 of the present invention includes a motion sensor in the form of an accelerometer 30. The accelerometer 30 may be a single-axis or multiple axis accelerometer that senses movement of the mobile phone 10 in a direction perpendicular to a linear axis of the optical display 12. In other words, the accelerometer 30 senses movement of the mobile phone 10 a direction of arrow w in FIG. 2. The accelerometer 30 outputs a signal to the sweep display controller 26 of the control circuit 20. By analyzing the output signal of the accelerometer 30, the sweep display controller 26 can detect back and forth sweeping motion of the mobile phone 10 in the direction of the arrow w. More specifically, using known techniques for processing the output of an accelerometer, the sweep display controller 26 can detect initial motion of the mobile phone 10 in the direction of arrow w, the direction of the motion (e.g., forward or reverse), the acceleration of the mobile phone 10, the velocity of the mobile phone 10 (e.g., by integrating the acceleration), the position of the mobile phone 10 (e.g., by integrating the velocity), etc.

The mobile phone 10 further includes a timing circuit 32 for providing appropriate timing of the output of the display data via the optical elements 13 during sweep display operation. As will be discussed in more detail in relation to FIG. 4, the linear array of LEDs 13 is presented with different display data at different points in time while the mobile phone 10 is moved in a sweeping motion from one position to another. Such timing is preferably a function of the velocity and/or position of the mobile phone 10 as determined by the accelerometer 30. By presenting the different display data to the LEDs 13 with the appropriate timing provided by the timing circuit 32, an intelligible display is presented to the viewer during each sweeping motion.

More specifically, the timing circuit 32 provides timing control to a display register 34 also included in the mobile phone 13. The display register 34 preferably is a shift register and stores a character string or image data intended to be displayed by a user. The sweep display controller 26 inputs the character string or image data to be displayed into the display register 34. The particular character string (e.g., "Hello, It's Me") may be entered by the user via the keypad 16, text-messaging via the mobile phone functions 25, etc. The particular manner in which the data to be displayed is entered into the mobile phone 10 is not germane to the invention.

The display register 34 includes an output port for outputting data to an LED driver 36 included in the mobile phone 10. The LED driver 36 in turn drives each of the LED optical elements 13 included in the optical display 12 in accordance with the data output from the display register 34. In the preferred embodiment, the timing circuit 32 provides a clock signal to the display register 34 that causes the character string or image data stored in the display register 34 to shift incrementally in one direction or the other such that the data displayed via the LED driver 36 and optical elements 13 changes incrementally in time as the mobile phone 10 is moved in a sweeping motion by the user.

A user wishing to display a message or graphic using the mobile phone display 12 will begin a sweeping motion of the mobile phone 10 in the forward or reverse direction of the arrow w (FIG. 2). The user performs the sweeping motion with the optical display 12 facing the intended viewer(s) as represented in FIG. 1. As will be described in more detail with respect to FIGS. 5A and 5B, the sweep display controller 26 processes the output of the accelerometer 30 in order to detect when a user begins motion of the mobile. Upon detecting motion exceeding a predefined threshold velocity, for example, the sweep display controller 26 determines the direction of the sweeping motion. Assuming, for example, that the sweep display controller 26 determines that the user is sweeping the mobile phone 10 from left-to-right as viewed by the viewer (e.g., as in FIG. 1), the timing circuit 32 provides a clocking signal to the display register 34 that causes the contents of the display register 34 to be shifted out from left-to-right (i.e., sequentially) beginning at the beginning of the character string (e.g., H→e→l→l→o→_→I→t→'→s→_→M→e). Conversely, if the sweep display controller 26 determines that the user is sweeping the mobile phone 10 in the reverse direction (e.g., right-to-left as viewed by the viewer) such as in a return sweeping motion as part of a back-and-forth sweeping motion by the user, the timing circuit 32 causes the contents of the display register 34 to be shifted out from right-to-left (i.e., again sequentially) beginning at the end of the character string (e.g., e→M→_→s→'→t→I→_→o→l→l→e→H (with the exception, of course, that the respective characters would be presented in their mirror image)). The length of the display register 34 preferably is chosen such that the maximum number of characters to be displayed can be adequately discerned along the length of a sweep (e.g., approximately 1 meter for an adult). Otherwise, the display cannot be completed in a given sweep as will be appreciated.

Figure 4:
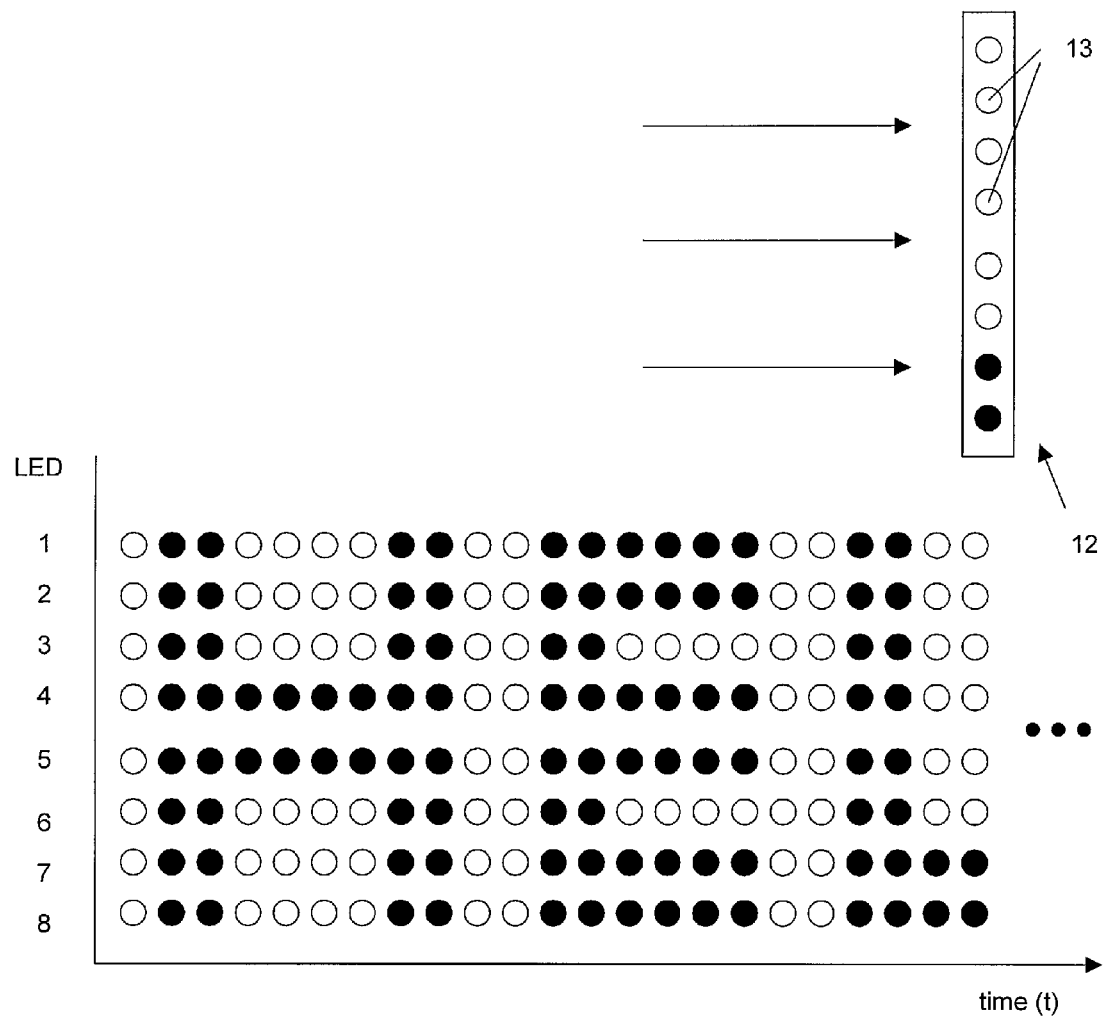
FIG. 4 schematically illustrates an optical display in accordance with an embodiment of the present invention.

FIG. 4 illustrates the manner in which LEDs 13 of the display 12, labeled LEDs #1-#8 for purposes of illustration, may be controlled as the mobile phone 10 is swept from left to right to form a display. Each column represents the status of the LEDs 13 at a given time increment as determined by the timing circuit 32. The same display as represented in FIG. 4 will occur in the reverse sweeping motion (only the direction of the time axis will be reversed as will be appreciated). The timing that the timing circuit 32 causes the data to be displayed as represented in FIG. 4 preferably is a function of the velocity of the sweeping motion as detected by the accelerometer 30. For example, if a user sweeps the mobile phone 10 in a relatively quick motion, the position of the mobile phone 10 along the length of the sweep (e.g., approximately 1 meter for an adult) will change more rapidly than if the user sweeps the mobile phone 10 in a slower motion. Preferably, the timing circuit 32 controls the timing as a function of velocity throughout the sweep as the mobile phone 10 accelerates from zero velocity to a maximum velocity and back to zero velocity before the user begins a sweep motion in the reverse direction. This avoids the resultant display possibly looking distorted towards the beginning and ends of the sweeps due to a change in velocity.

Alternatively, the timing circuit 32 may assume a constant or fixed velocity during each sweeping motion and provide generally constant or fixed timing to the display register 34 in view thereof. As yet another alternative, the timing circuit 32 may provide appropriate timing to the display register 34 based on a position calculation of the mobile phone 10 during each sweeping motion based on the output of the accelerometer 30. It will be appreciated that there are several ways in which the appropriate timing may be provided based on the output of the accelerometer 30.

Referring again to FIG. 3, the mobile phone 10 includes an antenna 40 coupled to a radio circuit 42. The radio circuit 42 includes a radio frequency transmitter and receiver for transmitting and receiving signals via the antenna 40 as is conventional. The mobile phone 10 further includes a sound processing circuit 44 for processing the audio signal transmitted by/received from the radio circuit 42. In addition, the sound processing circuit 44 serves to process the audio signal provided by the control circuit 20 during playback of media objects. Coupled to the sound processing circuit 44 are a speaker 46, and a microphone 48 which enable a user to listen and speak via the mobile phone 10 as is conventional. In addition, a headphone jack 50 coupled to the sound processing circuit 44 is provided. This allows a headset (not shown) to be connected to the mobile phone 10. The radio circuit 42 and sound processing circuit 44 are each coupled to the control circuit 40 so as to carry out overall operation.

The mobile phone 10 also includes the aforementioned display 14 and keypad 16 coupled to the control circuit 20. The mobile phone 10 further includes an I/O interface 52. The I/O interface 52 may be in the form of any one of many typical mobile phone I/O interfaces, such as a multi-element connector at the base of the mobile phone 10. As is typical, the I/O interface 52 may be used to couple the mobile phone 10 to a battery charger to charge a power supply unit (e.g., battery) 54 within the mobile phone 10. In addition, or in the alternative, the I/O interface 52 may serve to connect the mobile phone 10 to a wired personal hands-free adaptor (not shown) or Bluetooth adaptor (also not shown) for use with a Bluetooth-based hands-free adaptor. Further, the I/O interface 52 may serve to connect the mobile phone 10 to a personal computer or other device via a data cable, etc. As another alternative, the I/O interface 52 may serve to connect the mobile phone 10 to a docking station including an audio amplifier, speakers and/or video display to allow for enhanced viewing/listening of the media objects as part of the media player function.

Figure 5A:
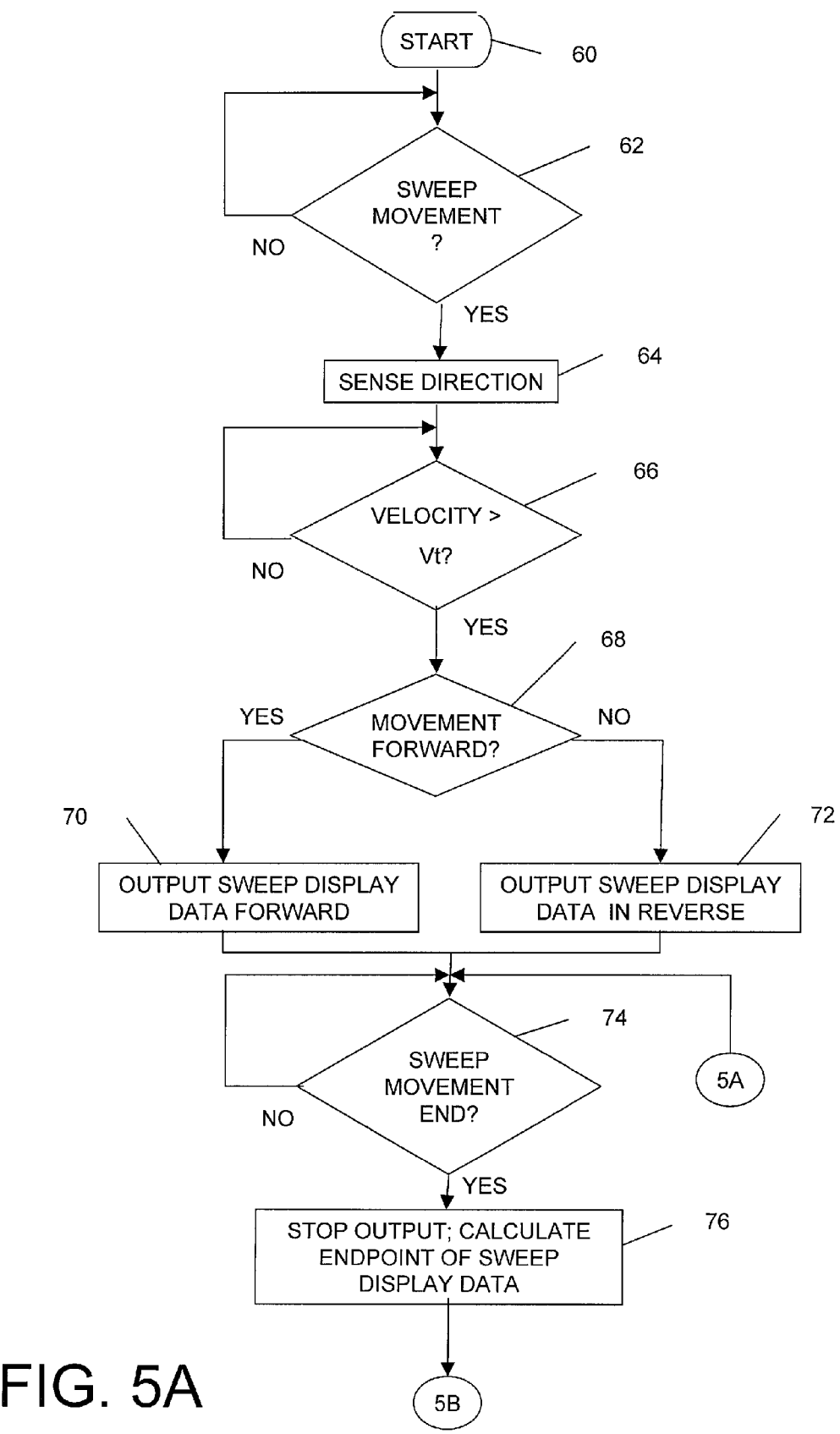
FIGS. 5A and 5B are a flowchart suitable for programming operation of an optical display in accordance with an embodiment of the present invention.
Figure 5B:
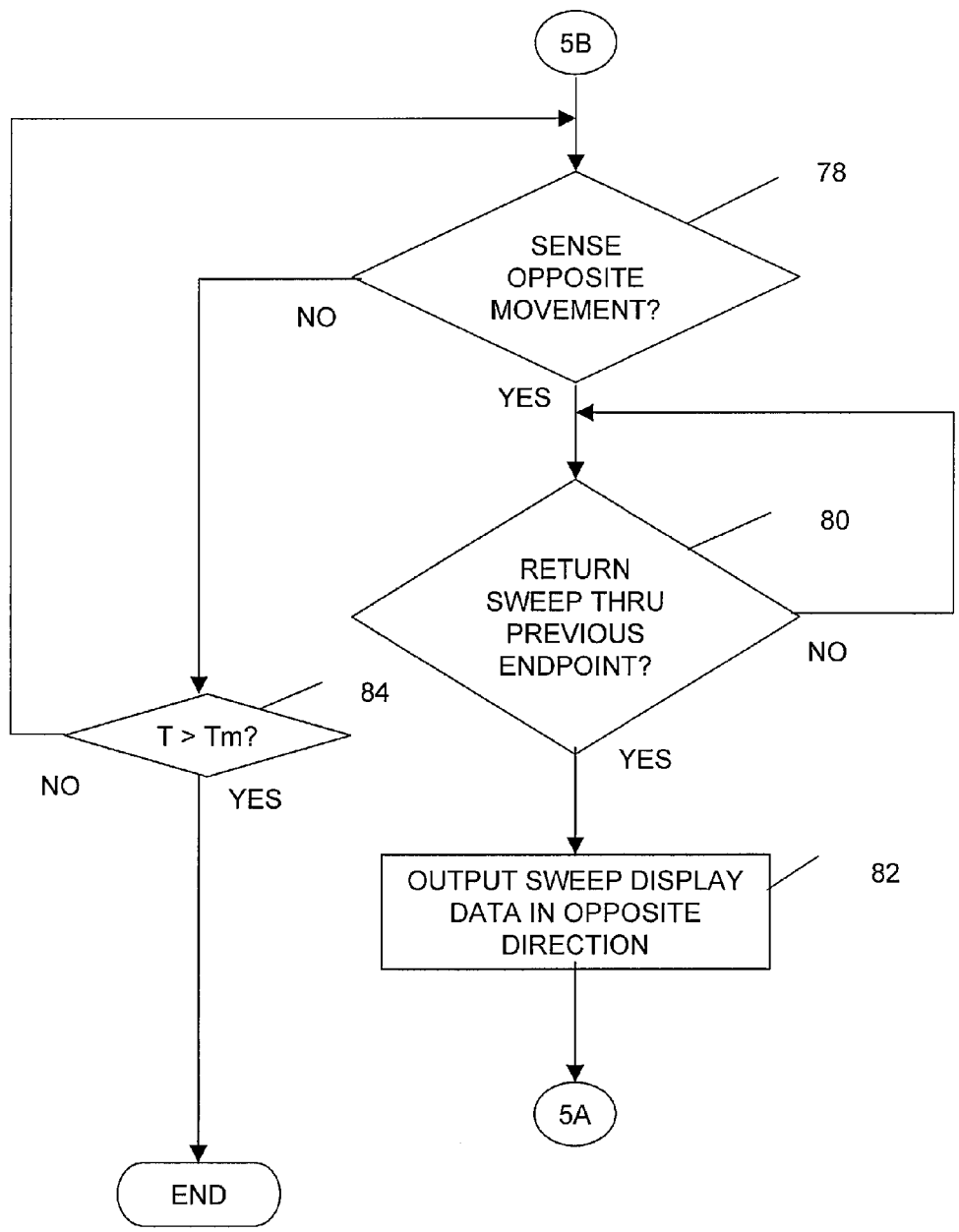

FIGS. 5A and 5B illustrate the operation of the sweep display controller 26 and the optical display 12 in accordance with the exemplary embodiment of the present invention. Beginning in step 60, the user of the mobile phone 10 may initiate use of the display by first ensuring that a desired message or graphical image is entered into the mobile phone 10 (e.g., via the keypad 16, received text message, etc.). The mobile phone 10 then stores the message in the display register 34 as discussed above. The user may then request operation of the optical display 12 by pressing a predefined button or by making predefined menu selections via navigation keys on the keypad 16, as will be appreciated.

Next, in step 62 the sweep display controller 26 determines if the user has begun a sweep movement (e.g., in the direction of arrow w in FIG. 2). As described above, the mobile phone 10 may detect such movement based on the output of the accelerometer 30. If no movement is detected, the mobile phone 10 continues to loop thru step 62 as shown. If the sweep display controller 26 does detect movement, the mobile phone 10 proceeds to step 64 in which the sweep display controller 26 senses the direction of the movement (e.g., from left-to-right or right-to-left in FIG. 1 as viewed by the viewer). The sweep display controller 26 may sense such direction based on the output of the accelerometer 30 as will be appreciated.

Following step 64, the sweep display controller 26 in step 66 determines if the movement exceeds a predefined threshold velocity Vt. The threshold velocity Vt preferably is selected as a minimum velocity at which the mobile phone 10 must be moved in a sweeping motion in order to produce a satisfactory display. As previously described, the sweep display controller 26 may detect such velocity based on the output of the accelerometer 30. If the sweep display controller 26 does not detect a velocity exceeding the threshold velocity Vt, the mobile phone 10 continues to loop thru step 66. On the other hand, upon detecting that the mobile phone is being moved at a velocity greater than the threshold velocity Vt, the sweep display controller 26 proceeds to step 68.

In step 68, the sweep display controller 26 determines whether the direction of the sweeping motion as determined in step 64 was forward (e.g., left-to-right) or reverse (e.g., right-to-left) as viewed by the viewer. If forward, the mobile phone 10 proceeds to step 70 in which the sweep display data in the register 34 is displayed in the forward direction based on the timing from the timing circuit 32 as described above. If the motion is reverse, the mobile phone 10 proceeds from step 68 to step 72 whereby the sweep display data in the display register 34 is output in the reverse direction as described above.

Following each of steps 70 and 72, the sweep display controller 26 in step 74 determines whether movement of the mobile phone 10 has ended during the present sweeping motion. For example, the output of the accelerometer 30 indicates when the velocity of the mobile phone 10 has stopped or dropped below a threshold velocity (e.g., Vt) during a given sweep. Upon the mobile phone 10 determining that movement of the mobile phone 10 has stopped thereby marking the end of a given sweep, the mobile phone 10 proceeds to step 76. In step 76, the output of the display data via the timing circuit 32 and display register 34 is stopped. In addition, the sweep display controller 26 preferably calculates the endpoint or end position of the mobile phone 10 relative to the presented display data as a result of the sweeping motion.

Next, in step 78 the sweep display controller 26 determines if movement in the opposite direction is detected by the accelerometer 30, thereby indicating a back-and-forth sweeping motion by the user. If yes, the mobile phone 10 in step 80 determines whether the position of the mobile phone 10 in the return sweeping movement is coincident with the endpoint of the display during the previous sweep as determined in step 76. Upon detecting such coincident position, the mobile phone 10 begins to output the display data via the display 12 in the opposite direction as represented in step 82. Control then returns to step 74 and the process is repeated for so long as the user continues the back-and-forth sweeping motion of the mobile phone 10.

As will be appreciated, if the user continues the back and forth sweeping motion of the mobile phone 10, the contents of the display register 34 may be programmed to be changed automatically by the sweep display controller 26 such that extended messages or displays may be presented to the viewer(s).

If in step 78 movement of the mobile phone 10 in the opposite direction is not detected, the mobile phone 10 proceeds to step 84. In step 84, the sweep display controller 26 determines if a time T greater than a predefined threshold Tm has passed since the previous sweeping motion stopped. If not, the sweep display controller 26 presumes the user may still be in the middle of back-and-forth sweeping movement of the mobile phone, and the mobile phone 10 continues to loop thru steps 78 and 84. On the other hand, if opposite movement is not detected within a time Tm as determined in step 84, the sweep display controller 26 presumes the user has stopped use of the optical display 12 and the process ends.

Those having ordinary skill in the art will therefore appreciate that the portable electronic device 10 of the current invention presents display data to the optical display 12 during motion of the portable electronic device 10. The portable electronic device 10 senses motion and provides the data to the display 12 as a function of such motion such that with the persistence of the viewer's vision, an intelligible display is created. As a result, the portable electronic device 10 can display a message (e.g., "Hello, It's Me"), image, or the like with an effective display width considerably larger than the width of the optical display 12 itself.

While the optical display 12 is exemplified herein as a linear array, it will be appreciated that other types of arrays of optical elements are also suitable without departing from the scope of the invention. Moreover, while the optical display 12 may be dedicated for use as a display as described herein, in another embodiment the optical display 12 may serve other type uses also. For example, the optical display 12 may serve as a visual LED bar indicator that flashes to indicate an incoming call in the case of a mobile phone 10.

Further, while the invention has been discussed primarily in the context of horizontal movement of the portable electronic device 10, it will be appreciated that the principles of the invention equally apply with respect to movement of the optical display in other directions (e.g., vertically).

The term "portable electronic device" as referred to herein includes portable radio communication equipment. The term "portable radio communication equipment", also referred to herein as a "mobile radio terminal", includes all equipment such as mobile phones, pagers, communicators, e.g., electronic organizers, personal digital assistants (PDAs), smartphones or the like.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

The invention claimed is:

1. A portable electronic device, comprising:
    an optical display;
    a display controller for presenting display data to the optical display in order to display the display data; and
    an accelerometer operatively coupled to the display controller,
    wherein the display controller presents the display data to the optical display as a function of motion of the portable electronic device as sensed by the accelerometer,
    wherein the display data comprises a character string, and the display controller presents the display data to the optical display sequentially beginning at a first end of the character string when the accelerometer senses motion in a first direction, and beginning at a second end of the character string when the accelerometer senses motion in a second direction opposite the first direction and back and forth motion of the portable electronic device in the first and second directions results in repeated display of the character string and
    wherein the display controller keeps track of a position at which the display of the character string ended during a previous motion in order to determine a position at which to begin the display of the character string during the next motion in the back and forth motion if the character string is not displayed in its entirety from the first end to the second end in the previous motion.

2. The portable electronic device of claim 1, wherein the display controller presents the display data to the optical display with timing that relies on the motion of the portable electronic device and persistence of a viewer's vision in order to present an intelligible display.

3. The portable electronic device of claim 2, wherein the timing is a function of a motion velocity of the portable electronic device.

4. The portable electronic device of claim 3, wherein the motion velocity is determined as a function of the output of the accelerometer.

5. The portable electronic device of claim 1, wherein the optical display consists of a linear array of optical elements.

6. The portable electronic device of claim 1, wherein the optical display comprises a rectangular array of optical elements.

7. The portable electronic device of claim 6, wherein the rectangular array of optical elements relies on the motion of the portable electronic device to provide an optical display having an effective width greater than the width of the rectangular array itself.

8. The portable electronic device of claim 1, wherein the movement is generally horizontal.

9. The portable electronic device of claim 1, wherein the movement is generally vertical.

10. The portable electronic device of claim 1, wherein the display data comprises graphical image data.

11. The portable electronic device of claim 1, wherein the portable electronic device comprises mobile phone electronics for carrying out mobile communications.

12. The portable electronic device of claim 11, wherein the optical display also functions to alert a user of an incoming call.

13. The portable electronic device of claim 1, wherein the optical display comprises a plurality of light emitting diodes (LEDs).

14. A method of providing a display using a portable electronic device having an optical display, the method comprising the steps of:
    sensing motion of the portable electronic device using an accelerometer; and
    presenting display data to the optical display as a function of motion of the portable electronic device as sensed by the accelerometer,
    wherein the display data comprises a character string, and the step of presenting the display data includes presenting the display data to the optical display sequentially beginning at a first end of the character string when the accelerometer senses motion in a first direction, and beginning at a second end of the character string when the accelerometer senses motion in a second direction opposite the first direction and repeating the step of presenting the character string when the sensing senses back and forth motion of the portable electronic device in the first and second directions and
    wherein a display controller keeps track of a position at which the display of the character string ended during a previous motion in order to determine a position at which to begin the display of the character string during the next motion in the back and forth motion if the character string is not displayed in its entirety from the first end to the second end in the previous motion.

15. The method of claim 14, wherein the step of presenting the display data to the optical display includes presenting the display data to the optical display with timing that relies on the motion of the portable electronic device and persistence of a viewer's vision in order to present an intelligible display.

16. The method of claim 15, wherein the timing is a function of a motion velocity of the portable electronic device.

17. The method of claim 16, wherein the motion velocity is determined as a function of the output of the accelerometer.

* * * * *